3,460,913
REGENERATION OF SULFUR CONTAMINATED CATALYSTS
James Hoekstra, Evergreen Park, Ill., assignor to Universal Oil Products Company, Des Plaines, Ill., a corporation of Delaware
No Drawing. Filed Dec. 27, 1966, Ser. No. 604,549
Int. Cl. C01b 17/22, 17/00
U.S. Cl. 23—224                                9 Claims

ABSTRACT OF THE DISCLOSURE

Catalysts which have been contaminated with sulfur can be regenerated by treatment with a sulfide solution, such as aqueous ammoniacal hydrogen sulfide.

---

The present invention relates to a process for regenerating a solid catalyst that has been deactivated by sulfur. More precisely, the present invention is concerned with the rectification of a deactivation problem that has heretofore plagued processes for oxidizing a sulfide solution, which processes employ a solid oxidizing catalyst and which are operated at conditions effecting oxidation of substantially all of the sulfide in the solution. This deactivation problem essentially involves the deposition of elemental sulfur on the solid catalyst. This deposited sulfur blocks access of the reactants to the active sites of the catalytic surface and, consequently, deactivates the catalyst. The concept of the present invention follows from my recognition that, under appropriate conditions, the deposited sulfur and a sulfide solution will react to form a soluble polysulfide compound. This polysulfide reaction is, accordingly, utilized in the present invention to strip deposited sulfur from the solid catalyst, thereby reactivating the catalyst. It is a feature of the present invention, furthermore, that the sulfide solution that is to be oxidized may be utilized to effect the reactivation, thereby greatly simplifying the resultant process.

As part of the price that has to be paid for a modern industrial society, large quantities of undesired sulfide solutions are currently available from a number of industrial sources. In particular, aqueous solutions containing hydrogen sulfide are undesired side products of many economically significant industrial processes in the chemical, petroleum, and steel industries. For instance, in the petroleum industry, large quantities of sulfide solutions are produced by such processes as hydrorefining, hydrocracking, reforming and the like. In fact, a common feature of all of these petroleum processes is that they operate on a petroleum fraction, a shale oil, a coal tar oil, and the like, which invariably contain quantities of organic and inorganic sulfur compounds. During the course of these petroleum processes, the organic sulfur compounds are converted into hydrogen sulfide and hydrocarbons. At least a portion of this hydrogen sulfide is then, typically, removed from these processes by absorption in a suitable solution. In a large measure, these solutions are aqueous alkaline solutions and their disposal presents quite a problem because of their potential biological oxygen demand which is primarily a consequence of the presence of sulfide ion. In a case of particular interest, hydrorefining of petroleum distillates, large quantities of ammonia and hydrogen sulfide are produced and these are generally absorbed in an aqueous solution which is withdrawn from the process. In a similar vein, sweetening treatment of natural gas with a suitable scrubbing fluid, such as monoethanolamine, also results in a solution containing sulfide ion.

The sulfide compound present in these solutions is generally present as a salt of a strong base such as ammonium sulfide, sodium sulfide, potassium sulfide, and the like, which may be ionized to various degrees. Moreover, the sulfide compound may be present in the same kind of polar association which characterizes, for instance, solutions of hydrogen sulfide in diethanolamine. In this respect, it should be remembered that hydrogen sulfide because of its polar nature is soluble in aqueous solutions to some degree even in the absence of an appropriate solubility-increasing agent; for example, at 20° C. and 1 atmosphere pressure, 2.5 ml. of hydrogen sulfide will dissolve in 1 ml. of water. Thus, hydrogen sulfide is within the class of the sulfide comopunds present in these solutions.

Quite understandably, in recent years attention has been focused upon means of converting these sulfide compounds into forms that have less demand for oxygen, and, if possible, into a form that has substantial economic value. I have now found an improvement in a process for converting these sulfide compounds, which process can be utilized, if desired, to transform them into valuable elemental sulfur and, alternatively, into sulfur compounds of reduced oxygen demand suitable for discharge into rivers and streams, if sulfur production is not economically feasible. Basically, my improvement consists of a simplified procedure for regenerating a solid catalyst that is employed in this process.

It is accordingly one object of my invention to provide a process for regenerating a solid catalyst that has been deactivated by sulfur deposition. A second object is to provide an improvement in a process for reducing the biological oxygen demand of a sulfide solution. A third object is to provide an improvement in a process for the production of elemental sulfur from a sulfide solution. Another object is to provide a procedure to reactivate a solid catalyst employed in sulfide oxidation service. Still another object is to provide a simple procedure for periodically stripping sulfur from the surface of a solid catalyst which is employed in sulfide oxidation service.

In a broad embodiment the present invention relates to a process for regenerating a solid catalyst that has been fouled by the deposition of elemental sulfur thereon. The process comprises contacting said solid catalyst with a sulfide solution at conditions effecting formation of a soluble polysulfide compound. Hence, this polysulfide reaction is utilized to remove the deposited sulfur.

In another broad embodiment, the present invention relates to an improvement in a process for the oxidation of a soluble sulfide compound. This process involves contacting oxygen and a solution of a sulfide compound with a solid oxidizing catalyst in a reaction zone at conditions effecting oxidation of substantially all of the sulfide compound. In this process, at least a portion of the product of the oxidation reaction is elemental sulfur and, inevitably, a portion of this sulfur is deposited on the solid oxidizing catalyst. These deposits foul the catalyst and interfere with the sulfide compound oxidation reaction. My improvement in this process encompasses periodically stopping the introduction of oxygen into the reaction zone, while continuing to charge the solution of the sulfide compound at conditions effecting polysulfide formation between the deposited sulfur and the sulfide compound. Accordingly, this procedure results in removal of deposited sulfur, thereby reactivating the catalyst and increasing the yield of elemental sulfur.

Other embodiments and objects of the present invention encompass particular sulfide solutions, catalytic compositions, process conditions, process configurations, and the like, which are hereinafter disclosed in the discussion of each of these facets of the present invention.

At this point, it is to be noted that a prominent feature of my invention is the capability to utilize, if desired, the solution undergoing treatment to effect the desired reactivation of the catalyst. This is in sharp contrast with the teaching of the prior art which generally recommend use of a suitable solvent for sulfur, or a burning procedure, or a sulfur vaporization procedure, in order to remove the deposited sulfur. Accordingly, an advantage of the present invention is the simplicity of the resultant process. Another advantage is the use of an inexpensive sulfide solution, which is generally a waste stream, to effect the removal instead of the expensive sulfur solvents of the prior art. Still another advantage is the capability of the present invention to easily recover, if desired, the elemental sulfur that has been removed from the catalyst by suitable treatment as will be hereinafter explained. A further advantage is the capability of the present invention to prevent the build-up of deposited sulfur on the catalyst, if operation in this manner is desired.

As pointed out hereinbefore, the solution to be oxidized in accordance with the improved process of the present invention contains a sulfide compound. This solution may be derived from any industrial operation such as those commonly available from chemical plants, sewage treatment plants, etc. The solvent utilized in forming the solution may be aqueous, alcoholic, ketonic, or any other suitable polar organic solvent. The solution is typically an aqueous solution and as such is commonly referred to as "waste water." In some cases, it is desired to convert the sulfide compounds contained in this solution to the corresponding sulfite, thiosulfate, sulfate, dithionate, etc., which are in a highly oxidized state and thus have little demand for oxygen. On the other hand, it may be desired to convert the sulfide compounds to elemental sulfur. In either case, the improved process of the present invention can effect the desired transformation. Furthermore, the sulfide compounds are generally present in small concentrations—for example, less than 5% by weight of the solution—although the present invention works well with solutions having a higher concentration of sulfide compound. In addition, the solution typically contains one or more components which enhances the solubility of the sulfide in the solution; examples of these are: ammonia; metallic salts of weak acids such as alkali metal carbonates, phosphates, arsenates, borates, etc., organic bases such as methyl amine, ethyl amine, ethanol amine, propanol amine, etc.; and others well known in the art. As previously noted, a particularly important class of solutions are ammoniacal, aqueous solutions of hydrogen sulfide.

Another essential reactant for the improved process of the present invention is oxygen. This may be present in any suitable form, either by itself or mixed with other gases. In an embodiment of the present invention, in which it is desired to produce elemental sulfur, oxygen is utilized in approximately the stoichiometric amount needed to effect this transformation—preferably, about 0.50 to about 1.50 moles of oxygen for every mole of sulfide. Alternatively, if it is desired to minimize the oxygen demand of the solution in order to allow its discharge into streams, oxygen is typically present in an amount in excess of the stoichiometric amount to convert sulfide to sulfate—preferably, in an amount greater than approximately 2.0 moles of oxygen per mole of sulfide.

As indicated previously, the oxidation process of concern to the present invention utilizes a solid catalyst. Any suitable solid oxidizing catalyst that is capable of effecting substantially complete oxidation of the sulfide compounds may be utilized in the present invention. However, it should be noted that the problem of catalyst deactivation due to sulfur deposition will typically differ as to degree of severity depending on the particular catalyst utilized. In any event, I have found that two particularly preferred classes of catalysts for the reactions of interest are metallic sulfide catalysts and metal phthalocyanine catalysts, and that these preferred catalysts are deactivated by sulfur deposition during use.

This preferred metallic sulfide catalyst is selected from the group consisting of sulfides of nickel, cobalt, and iron, with nickel being preferred. Moreover, in some cases, mixtures of these metallic sulfides may be employed. Although it is possible to practice the present invention with a solid catalytic bed of the metallic sulfide, it is preferred that the metallic sulfide be composited with a suitable carrier material. Examples of suitable carrier materials are: charcoals, such as wood charcoal, bone charcoal, etc. which may be activated prior to use; alumina; silica; zirconia; kieselguhr; bauxite; carbons, and other natural or synthetic, highly porous, inorganic carrier material. The preferred carrier materials are alumina and activated charcoal. Any suitable means of compositing the catalyst with the carrier material may be used including impregnating it by immersing it in a solution of a soluble salt of the desired metallic component and, thereafter, washing and drying it. The metallic component can then be converted to the sulfide by treatment with hydrogen sulfide, preferably at room temperature, or utilized as such in the process with the conversion to the sulfide being effected during the initial part of the processing period. In some cases, it may be advantageous to calcine the impregnated carrier material prior to sulfiding it. In general, when the metallic sulfide is composited with a carrier material, the amount by weight of the metallic component may range up to 60% or more of the total composite. However, it is generally preferred to operate in the range of about 10% to about 50% by weight of the total composite.

Yet another preferred catalyst for use in the present invention is a metal phthalocyanine catalyst composited with a suitable carrier material. Particularly preferred metal phthalocyanine catalysts include those of cobalt and vanadium. Other metal phthalocyanine catalysts that may be utilized include those of iron, nickel, copper, molybdenum, manganese, tungsten, and the like. Moreover, any suitable derivative of the metal phthalocyanine may be employed including the sulfonated derivations, the carboxylated derivatives, and the like. In the present invention, the phthalocyanine catalyst is utilized as a composite with a suitable adsorptive carrier material. The preferred carrier material is activated carbon. Additional details, as to alternative carrier materials, method of catalyst preparation, and the preferred amounts of catalytic components, are given in the teaching of U.S. Patent No. 3,108,081 for these phthalocyanine catalysts.

The improved process of the present invention can be carried out in any suitable manner and either in a batch or a continuous operation. A particularly preferred procedure involves a fixed bed system in which the catalyst is disposed in a reaction zone. The sulfide solution is then passed therethrough in either upward or downward flow and the oxygen is passed thereto in either countercurrent or concurrent flow.

When the improved process of the present invention is operated to produce substantial yields of elemental sulfur, the sulfur may be separated from the reaction zone effluent in any suitable manner such as filtration, centrifugation, settling, or by any other means known to the art of removing solid particles from a liquid. If desired, the effluent from the reaction zone may be passed to a sulfur settler which may be maintained at sufficiently elevated temperature (n.b. sulfur melts at about 112° C.)

so that the sulfur agglomerates. The liquid sulfur may then be removed by simply drawing off a separate immiscible liquid sulfur phase.

In some situations, it may be desirable to operate the process associated with the present invention in a multistage manner in order to effect complete conversion of the sulfide. For example, in some cases it may be desirable to operate the first stage in a manner designed to effect production of sulfur, with the effluent from the first stage, after sulfur separation, being subjected to a second stage designed to oxidize the remaining sulfide to sulfate, thereby allowing the discharge of this effluent into streams and rivers. Moreover, it is to be recognized that, in some cases, the substantially sulfide-free effluent from the process of the present invention may be recycled to the industrial process from which it came for further use therein.

The oxidation portion of the improved process of the present invention is effected at any suitable temperature which may range from ambient up to about 200° C. or more. When the process is operated to produce elemental sulfur it is preferred to operate in the range of about 0° C. to about 100° C. On the other hand, when the process is operated to produce sulfate, it is preferred to operate in a range of about 100° C. to about 200° C.

The pressure employed can be any pressure which maintains the sulfide solution in the liquid phase. In general, it is preferred to operate at superatmospheric pressures, and a pressure from about 25 p.s.i.g. to about 75 p.s.i.g. is particularly suitable.

Liquid hourly space velocity (LHSV) is defined to be the volume rate of the sulfide solution, charged to the reaction zone, divided by the total volume of catalyst within the oxidation zone (n.b., this is the space volume occupied by the catalyst bed). For my process, I have found that any suitable LHSV can be utilized, and I prefer to operate in the range of about 0.5 to about 4.0.

In any event, when the hereinbefore described process is performed, it has been observed that the principal deactivation mechanism is the deposition of elemental sulfur on the catalytic bed. This deposited sulfur tends to accumulate to the point where it begins to choke off access of the reactants to the active sites of the catalytic surface. At this point, it is noticed that the pressure drop across the bed tends to build to higher levels. This is in response to the deposited sulfur which slowly plugs up the bed. Moreover, when the process of concern to the present invention is operated in an embodiment designed to effect production of elemental sulfur, the expected yield of sulfur in the effluent stream from the process is materially lower than what would be expected from stoichiometric calculations. This last fact indicates that the sulfur acquisition capability of the bed is a substantial "sink" for elemental sulfur. Hence, effective recovery of the sulfur deposited thereon can significantly impact the yield structure of such a sulfur-production process.

As pointed out hereinbefore, I have now found that this deposited sulfur can be periodically removed from the catalytic bed by effecting a polysulfide formation reaction between it and a sulfide solution. In order to accomplish this, it is necessary to periodically stop the charging of oxygen to the oxidation zone. Although it is not necessary to do so, in some embodiments the oxygen may be replaced by an inert gas such as nitrogen in order to promote more intimate contact of the regenerating sulfide solution with the deposited sulfur.

Any suitable sulfide solution can be utilized to effect the desired regeneration operation. In some cases, it may be a sulfide solution especially prepared for this purpose in order to minimize the downtime for the regeneration operation. In other cases, it may be a concentrated sulfide solution prepared from the hydrogen sulfide and ammonia which are typically available from the thermal decomposition of the polysulfide-containing effluent from the reaction zone during the regeneration operation, as will be hereinafter explained. However, it is preferred that the sulfide solution utilized for regeneration be the same one that is to be oxidized during the oxidation portion of the improved process, since this solution is readily available and will conveniently effect the desired sulfur removal.

The regeneration operation can be performed at the same temperatures, pressures, and space velocities as are set forth hereinbefore for the oxidation portion of the processing cycle. It is preferred, however, to operate the regeneration portion of the cycle at a temperature greater than that employed during the oxidation portion of the cycle in order to more readily effect polysulfide formation—that is to say, approximately 50° C. to about 150° C. higher than that utilized during the oxidation portion of the process. Likewise, in some instances it may be advantageous to operate at a liquid hourly space velocity greater than utilized in the oxidation portion in order to accelerate the removal of the deposited sulfur. Preferred space velocities are generally from about one to about three times those employed in the oxidation portion of the cycle. Similarly, the pressure is ordinarily adjusted in a fashion commensurate with the change in temperature in order to maintain the desired liquid phase operation.

Two additional parameters of interest in the operation of the cyclic process of the present invention are the durations of the oxidation and regeneration portions of the cycle. These can be selected in a wide variety of ways depending on the particular results sought. For instance, the duration of the oxidation of the portion of the cycle can be determined as a function of the decline in activity of the catalyst as measured by the amount of sulfide ion in the effluent from the reaction zone, or as a function of the increase in pressure drop across the bed of catalyst as sulfur deposits thereon, or on the basis of a combination of these factors. Alternatively, the duration of the oxidation portion of the cycle can be fixed on the basis of past experience with the sulfide solution and catalyst that are to be employed, or on the basis of suitable experiments with these parameters. Still another convenient mode of operation is to operate such that substantial sulfur deposits do not accumulate on the bed; this mode merely requires frequent regeneration operations, to strip the deposited sulfur, regardless of the activity of the catalyst. The preferred method of operation is to fix the duration of the oxidation portion of the cycle on the basis of the decline in activity of the catalyst—specifically, to regenerate when the catalyst has declined in activity to about 50% to about 90% of its initial activity at the start of the oxidation portion of the cycle.

Likewise, the duration of the regeneration operation can be fixed in a number of different ways. It is preferred, however, to terminate it when the amount of sulfur recovered from the effluent from the reaction zone declines to about 10% to about 50% of the amount initially present when the regeneration operation is commenced.

Although the polysulfide-containing effluent from the reaction zone, that is produced during the regeneration portion of the cycle, can be discarded without further processing, in most cases it is preferred to subject this effluent to a suitable treatment sufficient to decompose the polysulfide contained therein into elemental sulfur and sulfide compounds (i.e. typically hydrogen sulfide). In general, suitable treatment involves a simple thermal treatment at elevated temperatures. In other cases, it may be necessary to treat with acid. In any event, the sulfur can then be recovered from the treated liquid by filtering, centrifuging, and the like, as previously mentioned. Moreover, the recovered sulfide compounds may be recycled to the oxidation portion of the process, if desired, in order to increase the yield of elemental sulfur, or utilized to produce a concentrated sulfide solution for regeneration.

In some cases it may be desirable to employ the present invention in a multiple bed system in which the solution of a sulfide compound is continuously being processed over a fresh catalyst bed while a spent catalyst bed is being regenerated.

The following examples are given to illustrate further the novelty, mode of operation, and utility of the present invention. It is not intended to limit unduly the present invention to the flow scheme, process conditions, and type of catalysts employed therein, since these are intended to be illustrative rather than restrictive.

The effluent from the reaction zone was collected and analyzed. Results of this analysis are summarized in Table I. From this table it can be seen that significant amounts of sulfur were carried out of the reaction zone during the regeneration operation.

TABLE I.—SUMMARY OF RESULTS OF SULFUR OXIDATION RUN

| Period No. | Portion of Cycle | Temp., °C. | Atoms O/ Atoms S | Percent elemental S in effluent [1] | Percent total S in effluent [1] |
|---|---|---|---|---|---|
| 1A | Oxidation | 35 | 1.2 | 27 | 35 |
| 1B | do | 35 | 1.2 | 48 | 57 |
| 2A | Regeneration | 125 | 0 | 64 | 110 |
| 2B | do | 125 | 0 | 51 | 130 |
| 3A | Oxidation | 35 | 1.2 | 73 | 95 |
| 3B | do | 35 | 1.2 | 75 | 97 |
| 4A | Regeneration | 125 | 0 | 50 | 120 |
| 4B | do | 125 | 0 | 5 | 86 |
| 5A | Oxidation | 35 | 1.2 | 74 | 96 |
| 5B | do | 35 | 1.2 | 74 | 99 |

[1] Based on amount of sulfur in the feed stream and calculated as elemental sulfur in all cases.

EXAMPLE I

This example demonstrates the capability of the present invention to effect removal of deposited sulfur from a solid oxidizing catalyst.

An alumina carrier material was manufactured in accordance with the method delineated in my U.S. Patent No. 2,620,314 by-passing droplets of an alumina hydrosol into an oil bath by means of a nozzle or rotating disk. After specific aging, drying and calcining treatment, as specified in the referenced patent, the carrier material was impregnated, in a rotary evaporator, with a solution of nickel nitrate solution in an amount sufficient to result in a final composite having 20% by weight nickel. After drying, the impregnated carrier material was saturated with gaseous annomia, and, thereafter, subjected to a temperature of 95° C. in order to drive off excess ammonia. Subsequently, the resultant composite was washed with water and then sulfided by passing a stream of hydrogen sulfide diluted with nitrogen over it at room temperature.

The resultant catalyst, in an amount of 100 cc., was then charged to a reaction zone. An equeous feed stream, containing 1.67% by weight of ammonia and 2.35% by weight sulfide, was then passed into contact with the catalyst in the reaction zone. The reaction zone was maintained at an inlet pressure of about 50 p.s.i.g. throughout the run. Likewise, the charge rate of the aqueous feed stream was held at approximately 100 mls. per hour for the duration of the run, thereby maintaining a LHSV of about 1.0.

For the purpose of illustrating an embodiment of the present invention in which the regeneration procedure is utilized to prevent the buildup of substantial amounts of deposited sulfur on the catalyst, the duration of the oxidation portion of the cycle was arbitrarily chosen, not on the basis of decline of activity of the catalyst, but on the basis of number of hours the catalyst was on stream. The cycle was divided into an oxidation portion, consisting of a line-out period and two test periods, and a regeneration portion of two test periods. The test periods were all of 3 hours duration while the line-uot periods varied between 3 and 7 hours. The oxidation portion was conducted at a temperature of about 35° C. and with the injection of air into the reaction zone in an amount calculated to provide 1.2 atoms of oxygen per atom of sulfur in the charge stock. On the other hand, the regeneration periods were conducted at about 125° C. and with the injection of nitrogen at a volumetric rate corresponding to the air rate utilized in the oxidation portion of the cycle.

For instance, during the first regeneration operation the elemental sulfur recovered from the effluent ranged from 64% to 51% of the atoms of sulfur in the charge stock. It is to be noted that this occurred in the absence of oxygen so that substantially all of this sulfur was deposited sulfur removed from the bed. The removal of sulfur is also evidenced by the fact that the total amount of all forms of sulfur in the effluent during the first regeneration period ranged from 110% to 130% of the amount of sulfur (present as sulfide) charged to the zone during this period. Subsequent regeneration periods show similar results, but these are somewhat affected by the fact that the oxidation interval was chosen arbitrarily and the rate of sulfur deposition appears to diminish in the second and third oxidation periods. Nevertheless, the capability of the sulfide solution to remove deposited sulfur is clear.

EXAMPLE II

This working illustration of the present invention indicates the improvement in operation that is characteristic of the present invention.

A commercially available charcoal (known as Nuchar WA) is impregnated with a solution of nickel nitrate which has a concentration sufficient to result in a final catalytic composite having 63% by weight nickel. After drying, the resultant composite is subjected to a stream of gaseous ammonia. It is then successively heated to 45° C. to drive off excess ammonia, washed with water, and sulfided with hydrogen sulfide at room temperature.

Two identical portions of the resultant catalyst are charged to two separate reaction zones—namely, Zone A and Zone B. An aqueous ammoniacal solution of hydrogen sulfide, containing sulfide in an amount of 2.35% by weight and ammonia in an amount of 1.67% by weight, is then charged to each of these zones at a rate corresponding to a LHSV of one. In addition, air, in an amount sufficient to supply 2.0 atoms of oxygen per atom of sulfur in the sulfide solution, is injected into each of the zones in admixture with the sulfide solutions. Furthermore, each of the zones is operated at a pressure of 50 p.s.i.g. and at a temperature of 35° C.

In each case, the sulfide solution is oxidized in a very selective manner to elemental sulfur and at very high activity. Moreover, in each case a slow decline in activity is noted. Zone A is continued in operation in the above manner until it has processed about 10 barrels of the charge stock per pound of solid catalyst. On the other hand, Zone B is operated in accordance with the present invention and when its effluent indicates that its activity has dropped to a level such that 80% of the sulfur in the feed stream is being oxidized, it is subjected to a regeneration operation.

This regeneration operation commences with the termination of the injection of air into Zone B. In place of air, nitrogen is charged to Zone B at the same volumetric rate that is used to inject air. Simultaneously, with the termination of air, the temperature of Zone B is raised to 125° C. During this time, the charging of the sulfide solution to Zone B at a LHSV of 1.0 is continued. This regeneration period is terminated when the elemental sulfur content of the effluent from the reaction zone drops to 40% of the value it has during the initial portion of the regeneration period. At this point, Zone B is returned to the oxidation portion of the cycle and operation is continued as before. After about five regenerations, Zone B has processed about the same amount of charge stock as Zone A, and the run is terminated.

A comparison is then made between the amount of sulfide effectively oxidized by Zone A and by Zone B, in the same total oxidizing time, and it is found that Zone B (i.e. operated according to the present invention) has oxidized two times as much sulfide as Zone A. Moreover, Zone B has sustained a conversion of at least 80% of the sulfide in the solution charged during this period, whereas in Zone A, the conversion has dropped below 50%.

Consequently, this example shows the ability of the present invention to markedly improve a sulfide solution oxidation process.

I claim as my invention:

1. A process for regenerating a solid catalyst that has been fouled by the deposition of elemental sulfur thereon which comprises contacting said solid catalyst with an aqueous alkaline sulfide solution at conditions such that the formation of a soluble polysulfide compound is effected thereby removing deposited sulfur.

2. The process of claim 1 further characterized in that said sulfide solution is an aqueous, ammoniacal solution of hydrogen sulfide.

3. In a process for the oxidation of a soluble sulfide compound contained in an aqueous alkaline solution, wherein oxygen and said solution of sulfide compound are contacted with a solid oxidizing catalyst in a reaction zone at oxidizing conditions, wherein at least a portion of said sulfide compound is oxidized to elemental sulfur, and wherein at least a portion of said sulfur deposits on said catalyst, thereby fouling it and interfering with the desired oxidation reaction, the improvement which comprises periodically stopping the introduction of oxygen into said oxidation zone while continuing to charge said aqueous alkaline solution of sulfide compound at conditions such that the formation of a soluble polysulfide is effected, thereby removing deposited sulfur.

4. The improved process of claim 3 further characterized in that said solution is an ammoniacal aqueous solution of hydrogen sulfide.

5. The improved process of claim 3 further characterized in that said solid oxidizing catalyst comprises a composite of a metal phthalocyanine and a carrier material.

6. The improved process of claim 3 further characterized in that said solid oxidizing catalyst comprises a composite of a sulfide of a metal selected from the group consisting of nickel, iron, cobalt, and mixtures thereof, and of a carrier material.

7. The improved process of claim 3 further characterized in that after the introduction of oxygen into said reaction zone is stopped, an inert gas is charged to said reaction zone.

8. The improved process of claim 3 further characterized in that a polysulfide-containing effluent from said reaction zone is thermally treated to decompose the polysulfide, thereby recovering elemental surfur.

9. The improved process of claim 3 further characterized in that said oxidizing conditions wherein at least a portion of said sulfide compound is oxidized to elemental sulfur include a temperature in the range of from about 0° C. to about 100° C. and said conditions at which the formation of a soluble polysulfide is effected include a temperature ranging from about 50° C. to about 250° C.

References Cited

UNITED STATES PATENTS

| | | | |
|---|---|---|---|
| 2,987,486 | 6/1961 | Carr | 252—420 XR |
| 3,029,201 | 4/1962 | Brown et al. | 210—63 XR |
| 3,148,156 | 9/1964 | Henry | 252—420 |
| 3,326,816 | 6/1967 | Urban | 252—420 XR |

PATRICK P. GARVIN, Primary Examiner

U.S. Cl. X.R.

23—134; 210—63; 252—412